United States Patent
Geddes

(10) Patent No.: US 8,112,482 B1
(45) Date of Patent: Feb. 7, 2012

(54) SYSTEM AND METHOD FOR SECURING ACCESS TO ELECTRONIC MAIL

(75) Inventor: Martin Geddes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1295 days.

(21) Appl. No.: 10/824,014

(22) Filed: Apr. 14, 2004

(51) Int. Cl.
*G06F 15/16* (2006.01)

(52) U.S. Cl. ..................................................... 709/206

(58) Field of Classification Search ........... 709/204–206
See application file for complete search history.

(56) References Cited

U.S. PATENT DOCUMENTS

| | | | | |
|---|---|---|---|---|
| 6,651,063 | B1 * | 11/2003 | Vorobiev | 707/10 |
| 6,845,452 | B1 * | 1/2005 | Roddy et al. | 726/11 |
| 2002/0138354 | A1 * | 9/2002 | Seal et al. | 705/26 |
| 2004/0024826 | A1 * | 2/2004 | Halahmi et al. | 709/206 |
| 2004/0068695 | A1 * | 4/2004 | Daniell et al. | 715/513 |
| 2004/0100972 | A1 * | 5/2004 | Lumb et al. | 370/401 |
| 2004/0168120 | A1 * | 8/2004 | Scopes | 715/501.1 |
| 2005/0044003 | A1 * | 2/2005 | O'Keeffe et al. | 705/26 |

\* cited by examiner

*Primary Examiner* — John Follansbee
*Assistant Examiner* — Maceeh Anwari

(57) ABSTRACT

A secure e-mail messaging system is positioned to receive an original e-mail message from a sender before the message is delivered to a recipient. To secure HTML mail, the system inserts a resource tag such as a Web bug and/or an HTML frame tag in the message, and it removes and stores a portion of the original e-mail message. The system then sends the modified e-mail message to the recipient. A reader of the message, who may or may not be the original recipient, opens the e-mail message with an e-mail client, which sends a resource request in response to the resource tag. The system receives the resource request and determines whether the reader is authorized to read the original e-mail message. If the reader is authorized to read the e-mail message, then it sends the removed portion to the authorized reader.

6 Claims, 5 Drawing Sheets

```
From:     employee02@company.com
To:       employee01@company.com
Subject:  Outcome of meeting
Date:     Mon, Jun 02 14:31:02 2003
```
```
To access e-mail content, please log on to the secure
e-mail server.

User name:   [          ]

Password:    [          ]
```

Fig. 3a

```
From:     employee02@company.com
To:       employee01@company.com
Subject:  Outcome of meeting
Date:     Mon, Jun 02 14:31:02 2003
```
```
CONFIDENTIAL
      The meeting went well. It looks like we are
going to make our takeover bid on Friday.
```

SYSTEM AND METHOD FOR SECURING ACCESS TO ELECTRONIC MAIL

BACKGROUND

The present invention relates to security services in network communications. In a particular embodiment, the invention relates to securing electronic mail communications.

Individuals use electronic mail to exchange all types of data, from personal communications, to business data, to advertisements. One feature of e-mail is that it can be copied and sent to several recipients with an ease that surpasses paper mail or other forms of communication. This feature, while especially useful for distributing advertising, company newsletters, or other widely distributed information, can make the exchange of confidential information risky. An e-mail message directed to a single recipient may, through inadvertence or intentional misuse, be directed to countless unauthorized readers. Nevertheless, the convenience of e-mail often leads users to overlook this risk. Once an e-mail message has been sent, it can be difficult not only to ensure that no one other than intended recipients will receive the message, but also to be informed if an unintended recipient has read the message.

Electronic mail marketers can keep track of which recipients open e-mail advertisements by including a "Web bug" in their advertisements. A Web bug is an address embedded in a document in such a way that an e-mail client attempts to fetch a resource at the address when it renders the document. Web bugs are commonly employed in e-mail advertisements formatted in the hypertext markup language (HTML). Such Web bugs usually take the form of a reference to a single-pixel image file. Advertisers can include Web bugs that identify different resources in e-mail advertisements sent to different recipients. The advertiser can then keep track of which recipients open the advertisement by tracking which resources have been requested by the recipients' e-mail clients. Typically, a Web bug is an HTML "img" tag that specifies a one-pixel image that is not visible to the recipient. The "img" tag includes a uniform resource locator (URL) that uniquely identifies the recipient. For example, an HTML e-mail advertisement sent to the address smith@firm.org might contain the following Web bug: <img width=1 height=1 border=0 src="http://webbug.com?recipient=smith%40firm.org">.

When Smith receives the HTML mail, his e-mail client attempts to load the resource located at the URL "http://webbug.com?recipient=smith%40firm.org". When a resource server at webbug.com receives a request to load this file, it knows that the e-mail sent to smith@firm.org has been opened. However, the resource server cannot determine whether the e-mail was read by the intended recipient—Smith—or by someone who has intercepted the e-mail or has otherwise received the e-mail without authorization.

The Internet protocol (IP) is commonly used for communications between computers on the World-Wide Web. An IP address is used to identify different nodes communicating over IP. On the Web, uniform resource locators (URLs) are used to identify resources. To request such a resource, a computer determines an IP address of the node from which the resource identified by the URL should be requested. One way for the computer to determine the IP address is to identify a domain name, such as www.website.com, in the URL and to determine an IP address based on the domain name. One way for a computer to determine an IP address based on a domain name is to consult a so-called "hosts" file at the computer, which provides a list of domain names and associates an IP address with each domain name in the list. Another way for a computer to determine an IP address based on a domain name is to send a domain name service (DNS) request to a domain name server, asking the domain name server for an IP address corresponding to the domain name.

SUMMARY

In a method of securing an e-mail message, a secure e-mail messaging system is positioned to receive an original e-mail message from a sender before the message is delivered to a recipient. The system creates a modified e-mail message by inserting a resource tag in the original message. In one embodiment, the system also removes and stores a portion of the original e-mail message. The system then sends the modified e-mail message to the recipient.

A reader of the message, who may or may not be the original recipient, opens the e-mail message with an e-mail client, which sends a resource request in response to the resource tag. The system receives the resource request and determines whether the reader is authorized to read the original e-mail message. If the reader is not authorized to read the e-mail message, the system may send an alert to the sender of the message and/or to an administrator responsible for e-mail security. If the reader is authorized to read the e-mail message, and if the system has removed a portion of the original message, then the system sends the removed portion to the authorized reader.

BRIEF DESCRIPTION OF THE DRAWINGS

FIGS. 3a and 3b illustrate the display at an e-mail client of a secure email system of a modified e-mail message.

DETAILED DESCRIPTION

I. Overview

Figure 1:
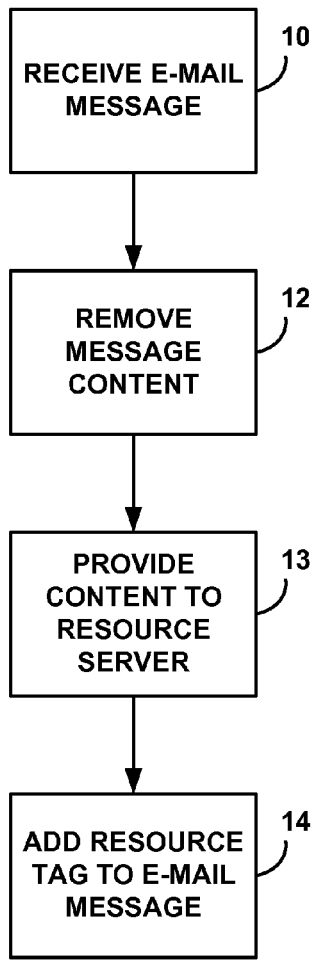
FIG. 1 is a flow diagram illustrating steps performed by a secure e-mail system.

In one embodiment, a secure e-mail system prevents unauthorized recipients from reading e-mail messages. The system receives an e-mail message addressed to a recipient before the message is received by the recipient. The system creates a modified e-mail message by removing a portion of the received e-mail message, such as the body of the message, and replacing the removed portion of the message with an HTML frame source tag. The removed portion of the e-mail message is then stored at a resource server. The system sends the modified e-mail to the recipient. When the recipient opens the modified e-mail with an HTML-enabled e-mail client, the e-mail client reads the frame source tag and requests the removed portion of the e-mail message from the resource server. When the client receives the removed portion, it displays the removed portion in an HTML frame.

To prevent unauthorized recipients of the e-mail message from reading the removed content, the resource server may request a user name and password from the recipient before sending the removed portion of the message to the recipient.

In some instances, it may be desirable to track who has read an e-mail message. For example, it may be desirable to determine if an unauthorized reader has read the message. One embodiment of the secure e-mail system enables tracking of readers of an e-mail message. In this embodiment, the system receives an e-mail message addressed to a recipient and then inserts a resource tag in the message to create a modified e-mail message. The resource tag may be an HTML frame source tag, as described above, or it may be a Web bug such as a single-pixel or zero-sized image HTML image tag. The system sends the modified message to the recipient.

When the recipient—or any subsequent reader of the e-mail message—opens the modified e-mail with an HTML-enabled e-mail client, the client requests a resource associated with the resource tag. To request the resource, the client selects an IP address corresponding to a resource URL in the resource tag, and the client then sends an HTTP request message to that IP address. The secure e-mail system then identifies the reader based on the request message. For example, the secure e-mail system may identify the reader of the e-mail based on the IP address from which the request message was sent.

In another example, the system uses the IP address to which the request message was sent to identify the reader of the e-mail message. In this latter embodiment, the system takes advantage of the ability of different e-mail clients to select different IP addresses corresponding to the same URL. For example, e-mail clients that are authorized to receive a message (such as clients associated with a particular company) may be provided with a hosts file listing a private IP address that corresponds to a domain name in the resource URL. Unauthorized e-mail clients, on the other hand, use a public IP address that is available from the public domain name service (DNS). The system is capable of receiving request messages at both the public and the private IP addresses. When it receives a request message at its private IP address, the system identifies the message reader who sent the request message as an authorized reader. On the other hand, when it receives a request message at its public IP address the system identifies the message reader as an unauthorized reader. The system then alerts the sender of the message and/or an administrator that an unauthorized recipient has read the message. Sections II through VI, below, elaborate on this and other examples of secure e-mail systems.

II. Modifying the E-Mail Message

A secure e-mail system is located along a communication path between a sender and a recipient. For example the secure e-mail system may be implemented at an e-mail server. As illustrated in FIG. 1, the secure e-mail system receives at step 10 a message that has been sent by a sender and is addressed to a recipient. The message may be in one of several formats, such as the formats described in P. Resnick, ed., "Internet Message Format," RFC 2822 (April 2001) and in "Multipurpose Internet Mail Extensions (MIME)" parts one through five, RFCs 2045-2049 (November 1996). The message may include text such as that of Example 1, below.

Date: Mon, Jun 02 14:31:02 2003
From: employee02@company.com
To: employee01@company.com
Subject: Outcome of meeting
  *
  *
  *
CONFIDENTIAL The meeting went well. It looks like we are going to make our takeover bid on Friday.

Example 1

Other information commonly included in an e-mail message, such as the complete header, has been excluded from Example 1 and subsequent examples for the sake of clarity.

The e-mail in Example 1 contains sensitive confidential information, but it has been sent in a plain text format. Accordingly, if it is sent to an unintended recipient, the unintended recipient can immediately read its contents. The sender of the e-mail may never become aware if an unintended recipient reads the e-mail.

A. Modification to Secure Message Data

In one embodiment of the secure e-mail system, the system modifies an e-mail message, such as the message of Example 1, by removing at least some of the contents of the message in step 12 and making the removed content accessible through a resource server in step 13. To enable a recipient's e-mail client to retrieve the removed content, the system replaces the removed content with a resource tag in step 14. The resource tag specifies the location of the removed content for the e-mail client. As illustrated in Example 2, below, the resource tag may be a frame source tag.

Date: Mon, Jun 02 14:31:02 2003
From: employee02@company.com
To: employee01@company.com
Subject: Outcome of meeting
  *
  *
  *
<FRAMESET>
<FRAME SRC=
"http://www.resourceserver.com/?messageID=16324">
</FRAMESET>

Example 2

In the message of Example 2, the body of the message has been removed and replaced with HTML code that directs the recipient's e-mail client to create an HTML frame set. The code includes a "FRAME" tag that identifies the resource URL "http://www.resourceserver.com/?messageID=16324". The resource URL added in Example 2 includes a domain name, "www.resourceserver.com", and a message identifier, "16324". The domain name identifies the server from which the message body may be retrieved, and the message identifier specifies which message is identified. The system may assign message identifiers sequentially, with identifiers incrementing with each new message, or by some other means. The removed content is provided to a resource server identified in the resource URL. The operation of the resource server is described in further detail in section V, below.

In this way, when an HTML enabled e-mail client receives the message, it will request the data at the resource URL. The operation of the e-mail client in requesting resources is discussed in further detail in section III, below.

B. Modification to Track Message Readers

In another embodiment of the secure e-mail system, the system modifies an e-mail message, such as the message of Example 1, by adding a resource tag without removing message contents. The resource tag is then used to identify readers of the e-mail message. The added resource tag may be a Web bug. Example 3, below, illustrates a modified version of the message of Example 1, in which a Web bug has been added.

Date: Mon, Jun 02 14:31:02 2003
From: employee02@company.com
To: employee01@company.com
Subject: Outcome of meeting
\*
\*
\*
CONFIDENTIAL
The meeting went well. It looks like we are going to make our takeover bid for on Friday.
<IMG SRC=
"http://www.resourceserver.com/?messageID=16324"
width="1" height="1" border="0">

Example 3

The Web bug added in Example 3 is the HTML "IMG" tag that identifies the resource URL "http://www.resourceserver.com/?messageID=16324". As in Example 2, above, the resource URL includes a domain name, "www.resourceserver.com", and a message identifier, "16324". The IMG tag instructs an e-mail client to retrieve the image at that resource URL and to display the image within the space of a single pixel, without a border. As described in further detail in section III, below, the e-mail client sends a request message to a resource server in response to the resource tag. The resource server then identifies the reader of the e-mail message based on the source, destination, and/or content of the request message, as described in section IV.B, below.

III. Operation of the E-Mail Client

An e-mail client for use with the secure e-mail system may take one of several forms. For example, the e-mail client may be a client device such as a personal computer or mobile telephone with Web access running conventional e-mail client software and/or conventional Web browser software. Preferably, the e-mail client is capable of reading and displaying HTML-formatted e-mails. In an embodiment in which the client accesses e-mail over the World Wide Web, the e-mail client may run conventional Web browser software without any specialized e-mail software. In one embodiment, the e-mail client runs a Windows, Linux, or Macintosh operating system that makes use of a hosts file.

Figure 2:
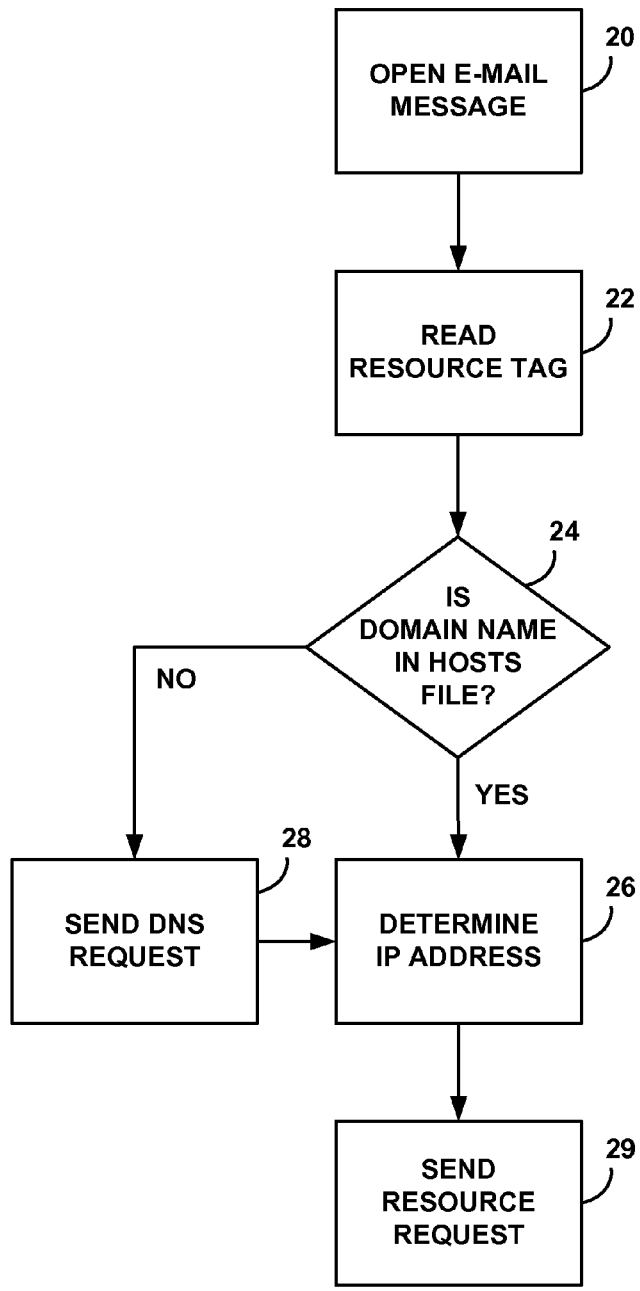
FIG. 2 is a flow diagram illustrating steps performed by an e-mail client.

As illustrated in FIG. 2, when a user of the e-mail client opens a modified e-mail message (step 20), such as those of Examples 2 and 3, above, the e-mail client reads the resource tag in step 22, identifies a resource address in the resource tag, and requests the resource at the resource address. In one embodiment, the resource tag is an HTML tag, such as an image tag or a frame tag. In such an embodiment, the resource address is a URL that includes a domain name.

To request the resource identified by the resource URL, the e-mail client determines an IP address corresponding to the domain name of the resource URL. To determine the IP address, the e-mail client checks whether the domain name is listed in a hosts file with a corresponding IP address (step 24). If so, the e-mail client selects the corresponding IP address listed in the hosts file (step 26). If the domain name is not listed in the hosts file, then the e-mail client sends a DNS request (step 28) that requests the IP address corresponding to the domain name. The e-mail client may receive a response to the DNS request from a local domain name server or from a public domain name server. The local domain name server may be operated by, for example, a company with which the e-mail client is affiliated. The e-mail client then selects the IP address received in response to its DNS request.

Having selected an IP address, the e-mail client sends a resource request in step 29 to the selected IP address requesting the resource identified by the resource URL. In one embodiment, the request message is an HTTP request message. For example, in Examples 2 and 3 above, the resource URL is "http://www.resourceserver.com/?messageID=16324". In that case, the request message may take the form shown in Example 4.

GET /?messageID=16324 HTTP/1.1
Host: www.resourceserver.com
Connection: close
User-agent: Mozilla/4.0
Accept-language: en Example 4

The e-mail client selects an IP address corresponding to the domain name "www.resourceserver.com", either from a hosts file or from a response to a DNS request, and it sends the request message of Example 4 to the selected IP address. The request message includes an identifier (the code "16324" in Example 4) that identifies the resource requested.

The e-mail client receives a response to the request message that includes the requested resource. In an embodiment (such as that of Example 2) in which the resource tag is a frame tag, the e-mail client receives the frame contents in response to the resource tag and displays the contents in an HTML frame. The frame contents may include content, such as message text, that was removed from the message by the secure e-mail system. In one embodiment, instead of including the removed content, the frame contents include an HTML form (illustrated in FIG. 3*a*) requesting security information, such as a user name and/or a password. A recipient of the message may enter his or her password in the form, and the e-mail client may then send a second request message conveying the security information. In a response to the second request message, the e-mail client may receive the removed message content from the secure e-mail system, if the recipient has sent valid security information, and display the removed messaged content, as illustrated in FIG. 3*b*). As described in further detail in section IV, below, the secure e-mail system operates to check the validity of the security information in the request message before responding to the request message with removed message content.

In an embodiment (such as that of Example 1) in which the resource tag is a Web bug, the e-mail client receives the requested resource, which may take the form of a single-pixel image.

IV. Securing Access to Message Contents

Figure 4:
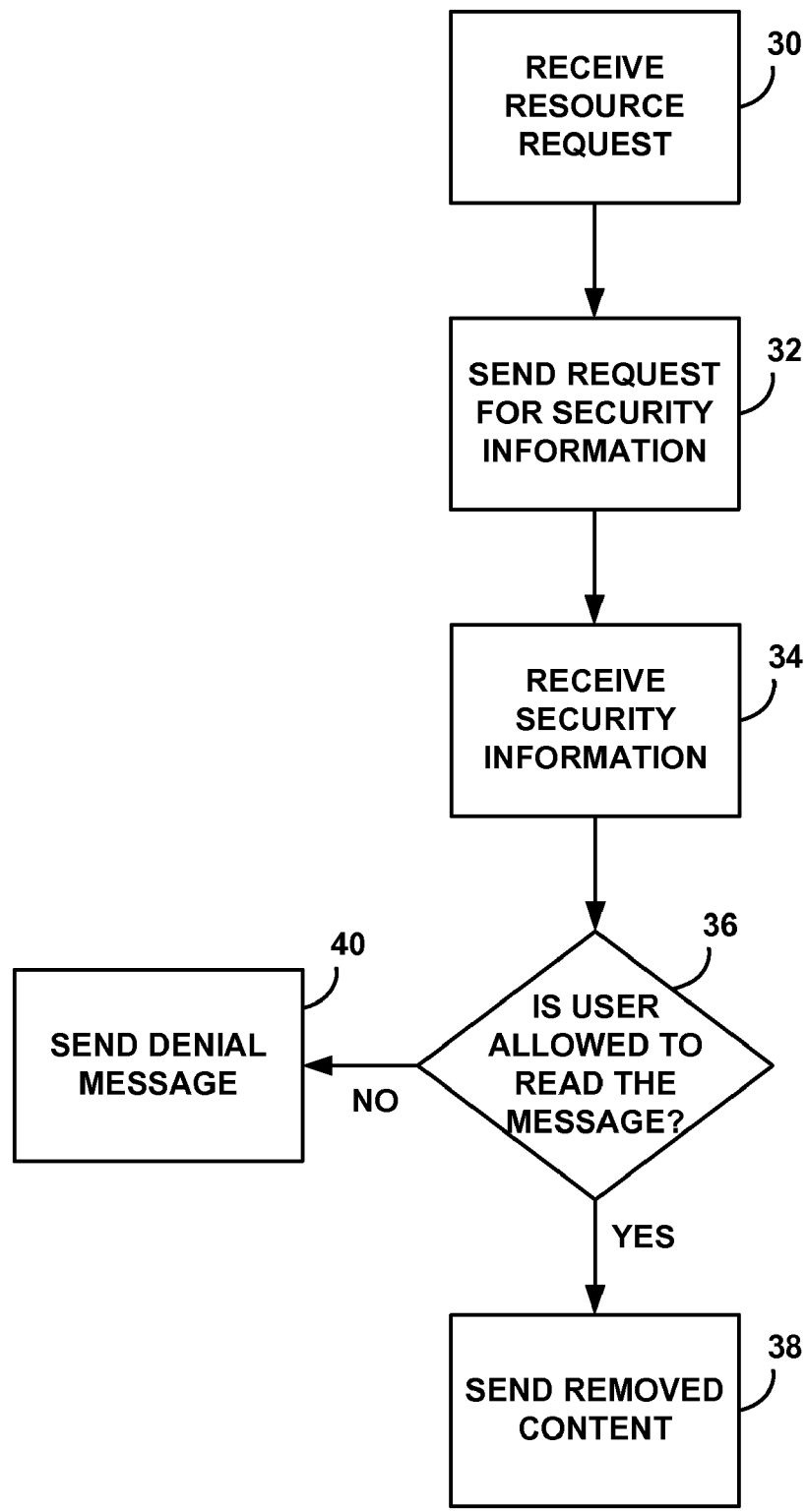
FIG. 4 is a flow diagram illustrating steps performed by a resource server at a secure e-mail system.

As described above, the secure e-mail system creates a modified e-mail message by adding a resource tag (section II). The secure e-mail system sends the modified e-mail message to an e-mail client, which then sends a resource request for the resource identified in the tag (section III). As illustrated in FIG. 4, the system receives the resource request in step 30. This section describes the operation of the secure e-mail system in receiving and processing requests from e-mail clients and in responding to those requests.

By identifying the sender of a resource request message, the secure e-mail system determines who is attempting to read the corresponding e-mail message. Based on the identity of the individual attempting to read the e-mail message, the system may perform one or more security functions. For example, the system may decline to send message contents to the reader, or the system may send an alert to the sender of the message, indicating that an unauthorized individual is attempting to read a message.

To identify the sender of a resource request message, the system may request security information, such as a user name and password, from the sender of the resource request. Alternatively, the system may identify the sender of the resource request by the EP address from which or to which the address message was sent.

A. Identifying Reader by Requesting Security Information

In one technique for identifying a reader of the e-mail message, the secure e-mail system sends a request for security information to the e-mail client (step 32). This embodiment is preferably implemented in the case (as described in section II.A, above) in which the secure e-mail system removes content from the e-mail message before sending the modified message to the recipient. The request for security information may be sent as an HTML form requesting a user name and password. After the secure e-mail system receives security information from the e-mail client (step 34), it determines whether the user who is operating the e-mail client has permission to read the removed content in the e-mail message (step 36). If the user does have permission to read the removed content, the secure e-mail system sends that content to the e-mail client (step 38). Otherwise, the system may send a response indicating that access to the message is denied (step 40).

One way for the secure e-mail system to determine whether a user has permission to read message contents is for the system to store permission information indicating which users are allowed to read which messages. In this embodiment, the system makes use of message identifiers to identify e-mail messages and a database that associates the message identifiers with permission information. The message identifier may be an alphanumeric code, such as the code "16324" in Examples 2 through 4. The permission information in the database identifies the level of security given to a message. For example, the permission information may specify that a message may be read only by a user to whom it is addressed, that a message may be read only by a specified group of users, or that a message may be read by any user.

In an embodiment making use of permission information, an e-mail client and the secure e-mail system exchange data as follows. The secure e-mail system sends to the e-mail client a modified e-mail message, such as the message of Example 2. As noted above, the message of Example 2 includes the message identifier "16324" in the resource tag. After receiving the modified message, the e-mail client sends to the secure e-mail system a resource request, such as the request message of Example 4, for the content identified in the resource tag. The secure e-mail system receives the request message and locates the message identifier in the request message. The secure e-mail system consults a database to determine the permission information associated with the identified message. If the permission information indicates that only a selected user or users can read the requested e-mail message, then the system determines whether the user operating the e-mail client is authorized to read the e-mail message.

To determine whether the user is authorized, the system identifies the user operating the e-mail client. To identify the user, the system first determines whether the user has already logged in to the secure e-mail system by providing a user name and password, for example while accessing a previous e-mail message. If not, the system responds to the resource request from the e-mail client by sending to the e-mail client a request for a user name and password. The system then identifies the user based on the user name and password it receives in response from the e-mail client. After identifying the user, the system checks the permission information to determine whether the user is authorized to read the e-mail message. If so, the system sends the removed content to the e-mail client. The removed content may be sent as a part of the entire e-mail message.

In an alternative technique for identifying the user, the system identifies the user based on the identity of the e-mail client with which the user opens the modified e-mail message. This alternative technique is particularly useful in situations where authorized users are not likely to provide unauthorized users access to their respective e-mail clients. In this technique, the secure e-mail system sends removed content of an e-mail message to an e-mail client only if the e-mail client is identified in the permission information as having access to the e-mail message. Techniques for identifying the e-mail client are described in section IV.B, below.

In another technique for identifying the user, the system employs the client authentication features of Secure Sockets Layer (SSL) protocol.

It should be noted that, in the context of this disclosure, it is not necessary to determine the precise identity of a user in order to "identify" the user. Rather, identification may involve only the collection of enough information to determine whether or not the user is authorized to read an e-mail message.

B. Identifying Reader by IP Address

In another technique for identifying a reader of an e-mail message, the secure e-mail system identifies the reader based on the IP address from which the e-mail client sends a request message to the system. Alternatively, the secure e-mail system identifies the e-mail client based on the IP address to which the e-mail client sends the request. After identifying the reader, the secure e-mail system may log the attempt to read the e-mail message, or the system may provide the content of the e-mail only to an authorized reader.

1. Tracking Readers by Sender IP Address

Figure 5:
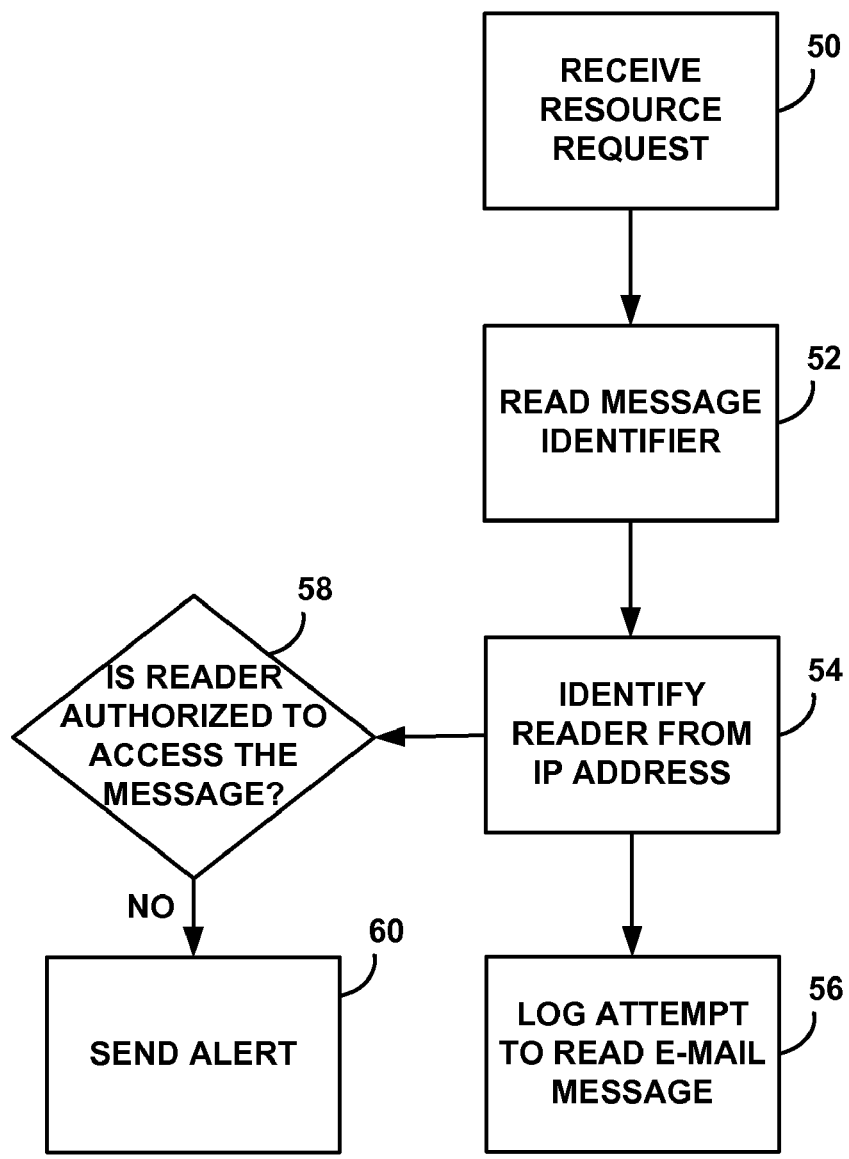
FIG. 5 is a flow diagram illustrating steps performed by a resource server at a secure e-mail system.

In one embodiment, illustrated in FIG. 5, the system identifies a reader based on the IP address from which the e-mail client sends a request message. The secure e-mail system keeps a log that associates e-mail messages with the e-mail clients at which the messages were opened. The log may be a database in which each entry is indexed by message identifier, and in which each entry lists the IP addresses of e-mail clients that have opened the message. When the system receives a request message (step 50), such as the message of Example 4, the system reads the message identifier (step 52) and locates the entry corresponding to the message identifier in the log. In the located entry, the system inserts the IP address from which the request message was received.

In an alternative feature, the secure e-mail system maintains data that associates IP addresses with user identifiers, such as e-mail addresses, user names, or group names. In this embodiment, the system determines a user identifier in step 54 based on the IP address from which the request message was sent. The system logs the attempt to read the message (step 56) by storing the user identifier in the entry corresponding to the message identifier.

2. Tracking Readers by Recipient IP Address

As discussed above in section III, above, an e-mail client attempting to retrieve a resource identified by a URL determines an IP address that corresponds to a domain name in the URL. One way for an e-mail client to determine the IP address is to look up the domain name in a hosts file. Because different e-mail clients can access different hosts files, the IP address determined by the client can be a distinguishing feature of the e-mail client. In an embodiment of the secure e-mail system that makes use of this feature, the secure e-mail system is capable of receiving request messages at one of a plurality of IP addresses. In this case, the system can identify an e-mail client based on which IP address the client sent a request message to.

In one embodiment, the secure e-mail system keeps a log that associates e-mail messages with the IP addresses to which request messages were sent. The log may be a database in which each entry is indexed by message identifier, and in which each entry lists the IP addresses to which the request message was sent. When the system receives a request message, such as the message of Example 4, the system locates the entry corresponding to the message identifier in the log. In the located entry, the system inserts the EP address to which the request message was sent.

In an alternative feature, the secure e-mail system maintains data that associates IP addresses with user identifiers, such as e-mail addresses, user names, or group names. In this embodiment, the system determines a user identifier based on the IP address to which the request message was sent. The system stores the user identifier in the entry corresponding to the message identifier. In one example implementing this feature, each e-mail client associated with a group, such as the employees of a company, is provided access to a hosts file. For example, a hosts file may be provided on a hard drive of each computer used as an e-mail host. The hosts file associates a resource domain name with a private IP address to which group members send request messages. In the public DNS system, a public IP address different from the private IP address is associated with the resource domain name. A modified e-mail message in this embodiment has a resource tag that includes the resource domain name. Then, when the e-mail client of a group member accesses the message, it sends a request message to the private IP address. E-mail clients other than group members, however, send the request message to the public IP address, allowing the secure e-mail system to determine when a non-member has opened an e-mail message.

3. Sending Alert Messages

After the secure e-mail system has identified a user that has opened an e-mail message, the system may simply keep a log, as described above, or the system may provide an alert to notify an administrator or other user when a message is accessed by an unauthorized user. In one embodiment, as the secure e-mail system creates a modified e-mail message from an original e-mail message, it stores in a database the message identifier and the e-mail addresses of the sender and addressee(s) of the message. The secure e-mail system identifies a reader of the message based on a request message received from the reader's e-mail client. If the system identifies someone other than the addressee(s) of the message as the recipient (FIG. 5, step 58), the system sends an alert (step 60) to the sender of the e-mail message. The alert may be sent via e-mail to the sender of the original e-mail message.

In another embodiment, the system sends an alert if a reader of a message is not a member of a group of users, such as an employee of a company. In this embodiment, the system identifies a reader of the message based on the contents of the request message and/or the IP address to or from which the request message was sent. If the reader is not a member of an authorized group, the system sends an alert—by e-mail, for example—to the sender of the original e-mail message or to a company administrator responsible for security.

V. Exemplary Secure System

Figure 6:
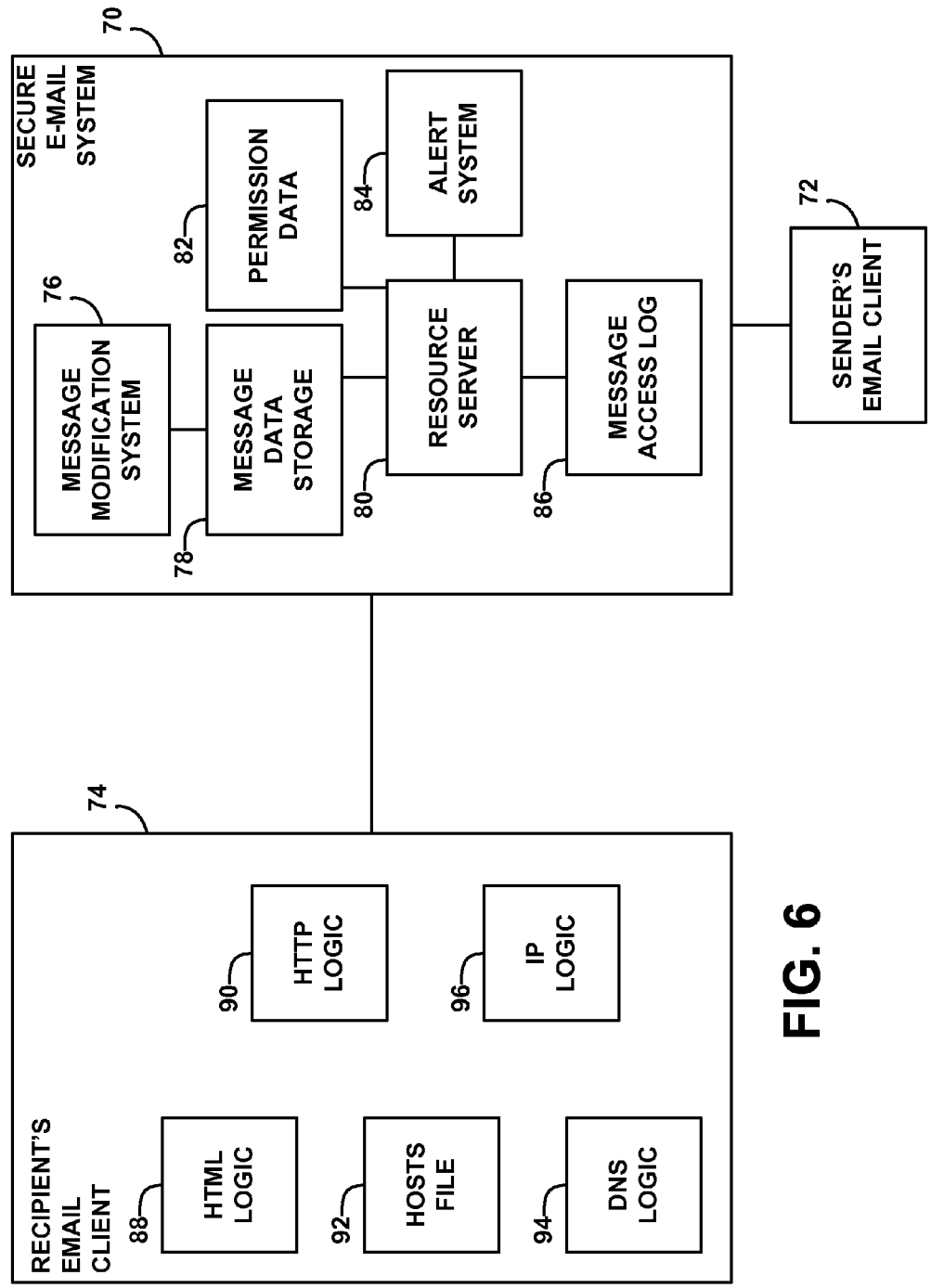
FIG. 6 is a block diagram illustrating the functional components of a secure e-mail system.

One implementation of a secure e-mail system is illustrated in FIG. 6. The secure e-mail system 70 communicates with a sender's e-mail client 72 and a recipient's e-mail client 74. Secure e-mail system 70 may be implemented by executable instructions stored in a data storage medium, such as a hard drive, and executed by a processor. In one embodiment, the secure e-mail system 70 is implemented as a software program running at an e-mail server computer.

The sender's e-mail client 72 sends an e-mail message that is addressed to a recipient. Before the e-mail message is delivered to the recipient, the secure e-mail system 70 receives the e-mail message. The secure e-mail system 70 is provided with message modification system 76 to insert a resource tag and/or to remove content from the e-mail message. Message data storage 78 in the secure e-mail system stores message content that has been removed by the message modification system 76 and associates the removed message content with a message identifier. Additional message data, such as the addresses of the sender(s) and recipient(s) of the e-mail message may also be stored in the message data storage.

A recipient's e-mail client 74 may be implemented by executable instructions stored in a data storage medium, such as a hard drive, and executed by a processor. In one embodiment, the e-mail client 74 is implemented as a software program running at an e-mail server computer. In one embodiment, the software program is a Web browser. An exemplary e-mail client 74 includes HTML logic 88 that operates to read an HTML resource tag in a modified e-mail message. HTTP logic 90 generates a resource request corresponding to the resource tag. The e-mail client 74 includes a hosts file 92 and DNS logic 94 to enable the e-mail client to determine an IP address associated with the resource tag, and IP logic 96 operates to send the resource request to the secure e-mail system.

The secure e-mail system 70 includes a resource server 80 that receives and responds to resource requests sent by readers of an e-mail message. In one embodiment, the resource server is implemented as a software program running at a Web server computer. The resource server may operate to determine the identity of the reader and to determine whether the reader is authorized. For example, the resource server may respond to a resource request with a request for a user name and password, or the resource server may identify the reader by the IP address to which or from which the resource request was sent. The resource server makes use of permission data 82 to determine whether a reader sending a resource request is authorized to access the message. If the reader is authorized to access the message, the resource server retrieves the removed portion of the message from the message data storage 78 and sends the removed portion of the message to the reader. If an unauthorized reader sends a resource request to the resource server 80, then an alert system 84 sends an alert to the sender of the message and/or to an administrator. The resource server 80 may write an entry into a message access log 86 to record each attempt to read an e-mail message.

VI. Alternative Embodiments

The system described herein can be embodied with variations from the examples described above, and the details of those embodiments can be implemented with a variety of techniques. For example, the e-mail client may be a wireless device such as a Web-enabled mobile telephone or a laptop computer with a wireless modem. Alternatively, the user device 10 may be a wired device such as a desktop or laptop computer with a cable, telephone, or DSL modem. Although the system has been described in particular with respect to the securing of e-mail messages, other embodiments of the system may be employed to secure other types of messages, such as short message service (SMS) messages, session initiation protocol (SIP) messages, or instant messages.

The embodiments described above should be understood to illuminate rather than limit the scope of the present invention. Features of the various embodiments can be interchanged and combined while keeping within the scope of the invention, as defined by the following claims.

The invention claimed is:

1. A method of securing an electronic message at an intermediary device, comprising:
   the intermediary device receiving an original message addressed to a recipient;
   the intermediary device creating a modified message by removing at least a portion of the original message, storing the removed portion of the original message, and inserting a resource tag in the modified message;
   the intermediary device sending the modified message, with the inserted resource tag, to the recipient;
   the intermediary device receiving, from a recipient of the modified message, a resource request for content referred to by the resource tag; and
   the intermediary device identifying the recipient of the modified message based on a destination Internet Protocol (IP) address to which the recipient sent the resource request,
   wherein if the destination IP address is a private IP address, the intermediary device (i) authorizes the identified recipient of the modified message, and (ii) sends the removed portion of the original message to the identified recipient of the modified message, and
   wherein if the destination IP address is a public IP address, the intermediary device (i) does not authorize the identified recipient of the modified message, (ii) does not send the removed portion of the original message to the identified recipient of the modified message, and (iii) sends an alert.

2. The method of claim 1, wherein the resource tag is a frame tag.

3. The method of claim 1, wherein identifying the recipient of the modified message is also based on an IP address from which the resource request was sent.

4. The method of claim 1, wherein identifying the recipient of the modified message includes requesting security information from the recipient of the modified message.

5. A system for securing a message, comprising:
   a processor;
   data storage; and
   instructions stored in the data storage and executable by the processor (i) to receive an original message addressed to an intended recipient; (ii) to create a modified message by removing at least a portion of the original message, storing the removed portion of the original message, and inserting a resource tag in the modified message; (iii) to send the modified message to the intended recipient, with the inserted resource tag; (iv) to receive, from an actual recipient of the modified message, a resource request for content referred to by the resource tag; and (v) to identify the actual recipient based on a destination Internet Protocol (IP) address to which the actual recipient sent the resource request, wherein if the destination IP address is a private IP address, identifying the actual recipient comprises identifying the actual recipient as the intended recipient and sending the removed portion of the original message to the actual recipient, and wherein if the destination IP address is a public IP address, identifying the actual recipient comprises identifying the actual recipient as not being the intended recipient, not sending the removed portion of the original message to the actual recipient, and sending an alert.

6. A method of securing an electronic mail message at an intermediary device, comprising:
   the intermediary device receiving an original electronic mail message addressed to an intended recipient;
   the intermediary device creating a modified electronic mail message by inserting a resource tag in the original electronic mail message and removing a portion of the original electronic mail message;
   the intermediary device sending the modified electronic mail message to the intended recipient;
   the intermediary device receiving, from a reader of the modified electronic mail message, a resource request for content referred to by the resource tag;
   if a destination Internet Protocol (IP) address to which the reader sent the request is a private IP address, the intermediary device (i) identifying the reader as the intended recipient, and (ii) sending the removed portion of the original electronic mail message to the reader, and
   if the destination IP address to which the reader sent the request is a public IP address, the intermediary device (i) identifying the reader as not being the intended recipient, (ii) not sending the removed portion of the original electronic mail message to the reader, and (iii) sending an alert.

* * * * *